(12) United States Patent
Hui et al.

(10) Patent No.: US 9,479,441 B2
(45) Date of Patent: Oct. 25, 2016

(54) DATA RATE ADAPTATION BASED ON TIME-BASED EVENTS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 14/156,039

(22) Filed: Jan. 15, 2014

(65) Prior Publication Data
US 2015/0200870 A1    Jul. 16, 2015

(51) Int. Cl.
*G06F 15/173* (2006.01)
*H04L 12/815* (2013.01)

(52) U.S. Cl.
CPC ..................... *H04L 47/22* (2013.01)

(58) Field of Classification Search
CPC ....................................................... H04L 47/76
USPC ......................................................... 709/226
See application file for complete search history.

(56) References Cited

U.S. PATENT DOCUMENTS

| 6,157,957 A | 12/2000 | Berthaud |
| 6,401,127 B1 | 6/2002 | Lei et al. |
| 6,771,661 B1 * | 8/2004 | Chawla ............... H04L 12/5695 370/468 |
| 6,956,865 B1 | 10/2005 | Khaunte et al. |
| 2007/0253346 A1 * | 11/2007 | Nguyen ................ H04L 12/462 370/256 |

OTHER PUBLICATIONS

Levis et al; The Trickle Algorithm; Mar. 2011; Internet Engineering Task Force [IETF] RFC 6206; pp. 1-13.*
Levis, et al., "The Trickle Algorithm", Internet Engineering Task Force, Request for Comments 6206, Mar. 2011, 13 pages., Internet Engineering Task Force Trust.
Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Glenford Madamba
(74) *Attorney, Agent, or Firm* — Parker Ibrahim & Berg LLC; James M. Behmke; Stephen D. LeBarron

(57) ABSTRACT

In one embodiment, a plurality of time-based events is determined in a computer network. Messages are transmitted in the computer network in accordance with the plurality of time-based events. A transmission data rate of the transmitted messages is determined. Then, the transmission data rate is adjusted according to the plurality of time-based events.

23 Claims, 8 Drawing Sheets

DATA RATE ADAPTATION BASED ON TIME-BASED EVENTS

TECHNICAL FIELD

The present disclosure relates generally to computer networks, and, more particularly, to data rate adaptation based on time-based events.

BACKGROUND

An important communication primitive in Smart Grid advanced metering infrastructure networks is multicast. Group-based network management operations and firmware downloading are just a couple of examples where multicast is used extensively. To efficiently support multicast, certain implementations utilize a plurality of time-based events, such as a Trickle algorithm, to manage the multicast disseminations. Trickle-based multicast specifies a network-layer forwarding strategy that implements a controlled flood with adaptive retransmission timers and suppression techniques.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a plurality of time-based events is determined in a computer network. Messages are transmitted in the computer network in accordance with the plurality of time-based events. A transmission data rate of the transmitted messages is determined. Then, the transmission data rate is adjusted according to the plurality of time-based events.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
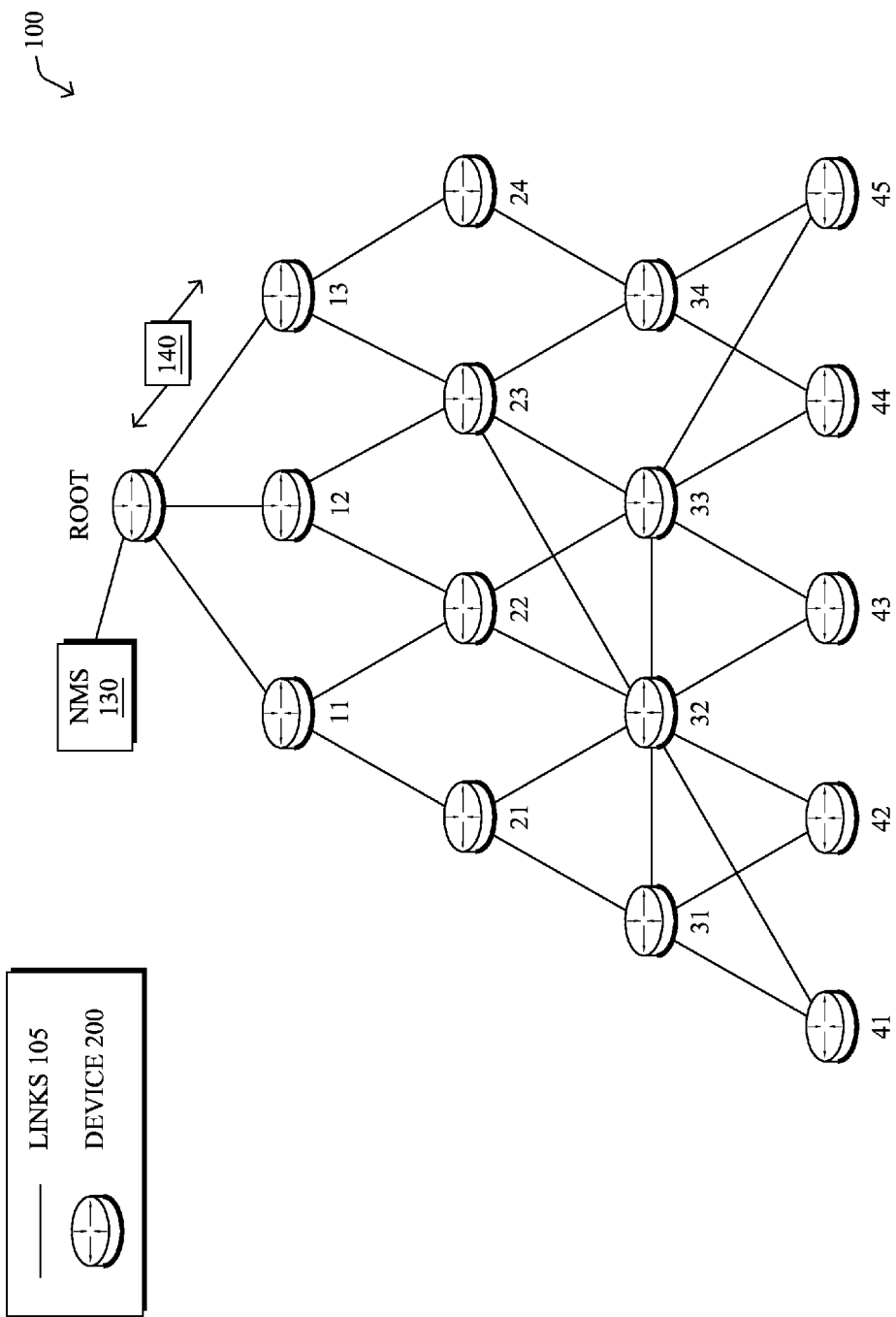
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. Moreover, the network 100 may include a centralized management node, e.g., network management server (NMS) 130, in communication with the nodes 200, via the root node, for example. The centralized management node may effectively act as a network control center for the nodes 200 by managing the nodes' firmware, settings, actions, policies, and the like.

Figure 2:
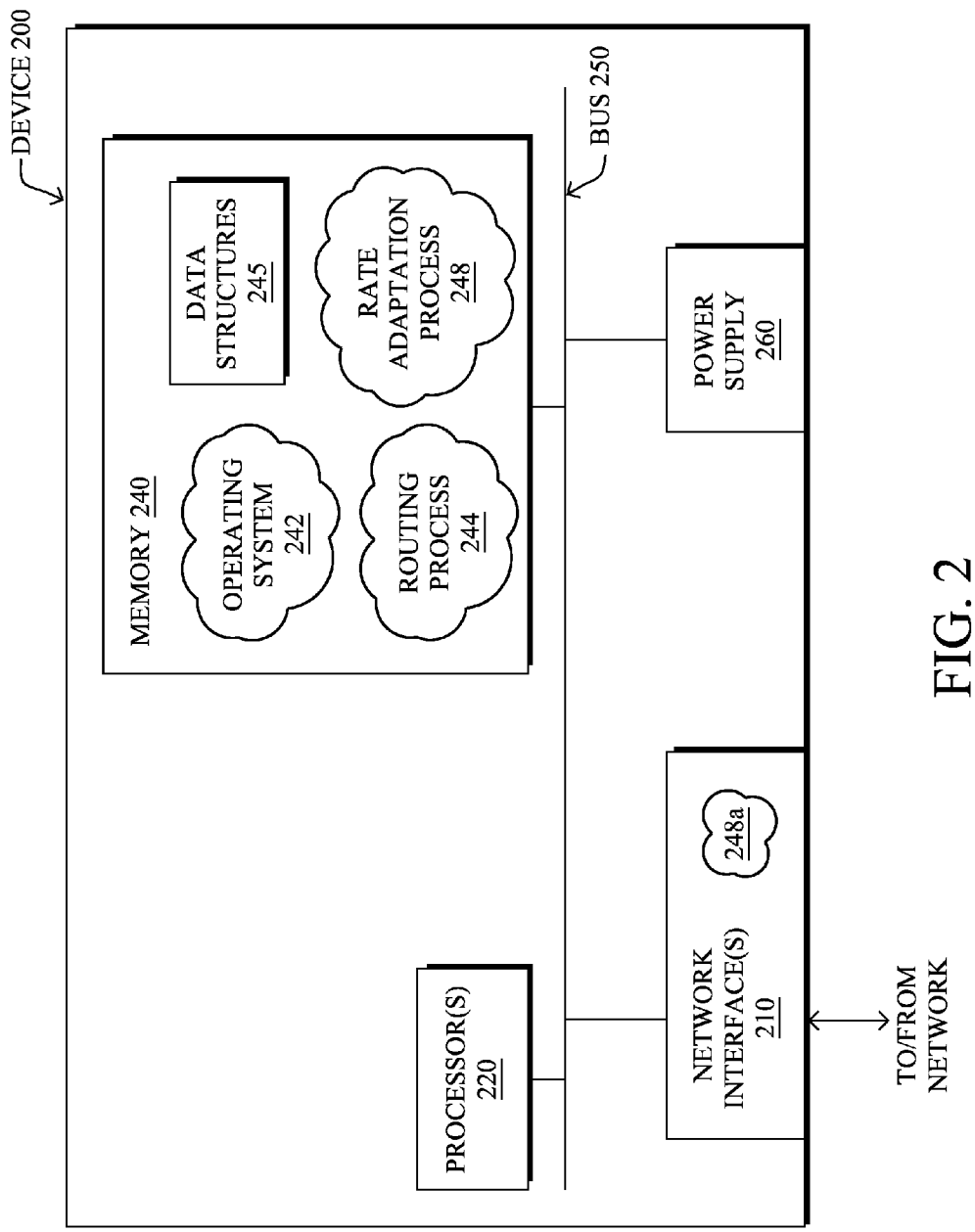
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise, for example, routing process/services 244 and an illustrative data rate adaptation ("rate adaptation") process 248, as described herein. Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. Also, while data rate adaptation process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As further noted above, one leading link technology for Smart Grid AMI networks is IEEE 1901.2 Power Line Communication (PLC). IEEE 1901.2 specifies an OFDM physical layer that increases overall throughput and robustness across a noisy and unpredictable medium. IEEE 1901.2 is standardizing an Adaptive Tone Mapping process which seeks to optimize the link data rate to observed link conditions. By intelligently adjusting the transmission parameters (e.g., modulation, code rate, tone map), it is possible for the effective throughput to improve by more than an order of magnitude difference. In general, slower data rates offer a more robust transmission strategy. The current proposal in IEEE 1901.2 takes a very conservative approach by having all broadcast messages sent using the slowest transmission mode (called "ROBO" mode in IEEE 1901.2). Broadcast messages are typically used for discovering neighbors and using the lowest data rate maximizes the communication range when discovering neighbors.

An important communication primitive in Smart Grid AMI networks is multicast. Group-based network management operations and firmware download are just a couple of examples where multicast is used extensively. Multicast may also be utilized at the application layer to schedule reads that provide Demand-Response commands to large groups of devices. To efficiently support multicast, certain implementations utilize a plurality of time-based events, such as a Trickle algorithm, to manage the multicast disseminations. Multicast based on Trickle, which is currently being specified in the IETF (draft-ietf-roll-trickle-mcast), specifies a network-layer forwarding strategy that implements a controlled flood with adaptive retransmission timers and suppression techniques.

Trickle-based multicast relies on link-layer broadcast to efficiently forward a message to an arbitrary number of neighbors using a single transmission. Unfortunately, as currently specified in IEEE 1901.2, link-layer broadcasts are always sent using the slowest data rate (ROBO) mode. When viewed on a per-device basis, sending in ROBO mode seems to be the most intuitive strategy, since ROBO mode seeks to maximize the communication range. However, when looking at a network-wide scale, sending in ROBO mode is actually counter-productive. Using a slow transmission data rate, such as ROBO mode, results in a much longer transmission, which occupies the channel for a longer period of time, increases the likelihood of collisions, and exacerbates the hidden-terminal problem. Thus, very poor network performance may occur when multicast disseminations are occurring. Not only is multicast forwarding unreliable and slow, but it severely reduces the performance of unicast traffic as well since the communication medium is shared. This performance degradation can affect important delay-sensitive messages.

In view of the above drawbacks, overall dissemination performance may be improved by allowing higher data rate transmissions when performing multicast dissemination. To give a sense of the tradeoff, one dissemination strategy may involve a single slow transmission and another may involve 10 transmissions by 10 different devices at 10 times the data rate. The latter dissemination strategy provides a number of advantages, including both spatial and temporal diversity. Furthermore, breaking up the transmission into ten separate ones allows other traffic (e.g., delay-sensitive unicast traffic) to occur in-between. However, transmitting at a high data rate assumes that the network is dense enough for a transmission to reach a significant number of neighbors. There will be cases where transmitting at a lower data rate is necessary to reach more sparsely connected areas.

Data Rate Adaptation Based on Time-Based Events

The techniques herein provide a method for improving message dissemination performance in low-power lossy networks (LLNs) that support adaptive transmission rates at the link layer. The present disclosure generally involves: (i) adapting the link layer transmission data rate based on the Trickle period I, and particularly, using faster data rates with small Trickle periods and slower data rates with larger Trickle periods; (ii) maintaining the number of Trickle transmissions and using a slower data rate when the number of Trickle transmissions by a device exceeds a threshold; (iii) remembering when a slow data rate transmission was needed to service a neighboring device to improve the overall performance of subsequent disseminations and improving the long-tail distribution; and (iv) implementing a control loop that allows a central device to tune the mapping between Trickle timer intervals and link layer transmission data rates.

Specifically, according to one or more embodiments of the disclosure as described in detail below, a plurality of time-based events is determined in a computer network. Messages are transmitted in the computer network in accordance with the plurality of time-based events. A transmission data rate of the transmitted messages is determined. Then, the transmission data rate is adjusted according to the plurality of time-based events.

Illustratively, the techniques described herein may be performed by hardware, software, and/or firmware, such as in accordance with the "data rate adaptation" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various communication protocols (e.g., particularly those to which the Trickle algorithm may be applied), and as such, may be processed by similar components understood in the art that execute those protocols, accordingly.

Operationally, an objective of the disclosed embodiments is to improve multicast dissemination performance in a computer network, such as a PLC-based Smart Grid AMI networks. The disclosed embodiments may apply data rate adaptation to multicast disseminations (e.g., as made available by IEEE 1901.2) according to a plurality of time-based events, such as events determined by a Trickle-based algorithm. Using this approach, it may be possible to utilize high data rates during the initial stages of the dissemination, but fallback to lower data rates during the later stages of the dissemination. Additional mechanisms are disclosed to further improve the dissemination performance for subsequent multicast packets, as described herein.

The fundamental premise of the Trickle algorithm, as described in detail in Request for Comment (RFC) 6206, is that a device periodically transmits data to other devices unless it hears other transmissions whose data suggest its own transmission is redundant. According to Trickle, there are two possible outcomes to data transmission(s) from a given device: 1) every receiving device (i.e., recipients) that hears the message finds that the message data is "consistent" with its own state (e.g., the data is redundant); or 2) any one recipient detects that the message data is "inconsistent" with its own state (e.g., the data is not redundant). Detection can be the result of either an out-of-date device hearing something new, or an updated device hearing something old. With respect to software updates, for example, as long as every device communicates somehow, i.e., either receives or transmits data, some device will detect the need for an update.

Trickle maintains a number of variables, including a time interval I, time value t, and count c. At the beginning of each Trickle period, which lasts for a duration of interval I, a random time t in [I/2, I) is chosen and c is reset to 0. Whenever Trickle receives a "consistent" message, it increments c. Whenever Trickle receives an "inconsistent" message, and I is greater than $I_{min}$, then Trickle immediately starts a new Trickle period. At time t, if c is less than a threshold k, Trickle transmits a message. At the end of the interval I, Trickle doubles I and immediately starts a new period. Intuitively, Trickle's adaptive timer allows it to propagate a new messages quickly while minimizing control overhead in the steady state. The suppression mechanism minimizes redundant transmissions and allows Trickle to adapt to varying densities.

Figure 3:
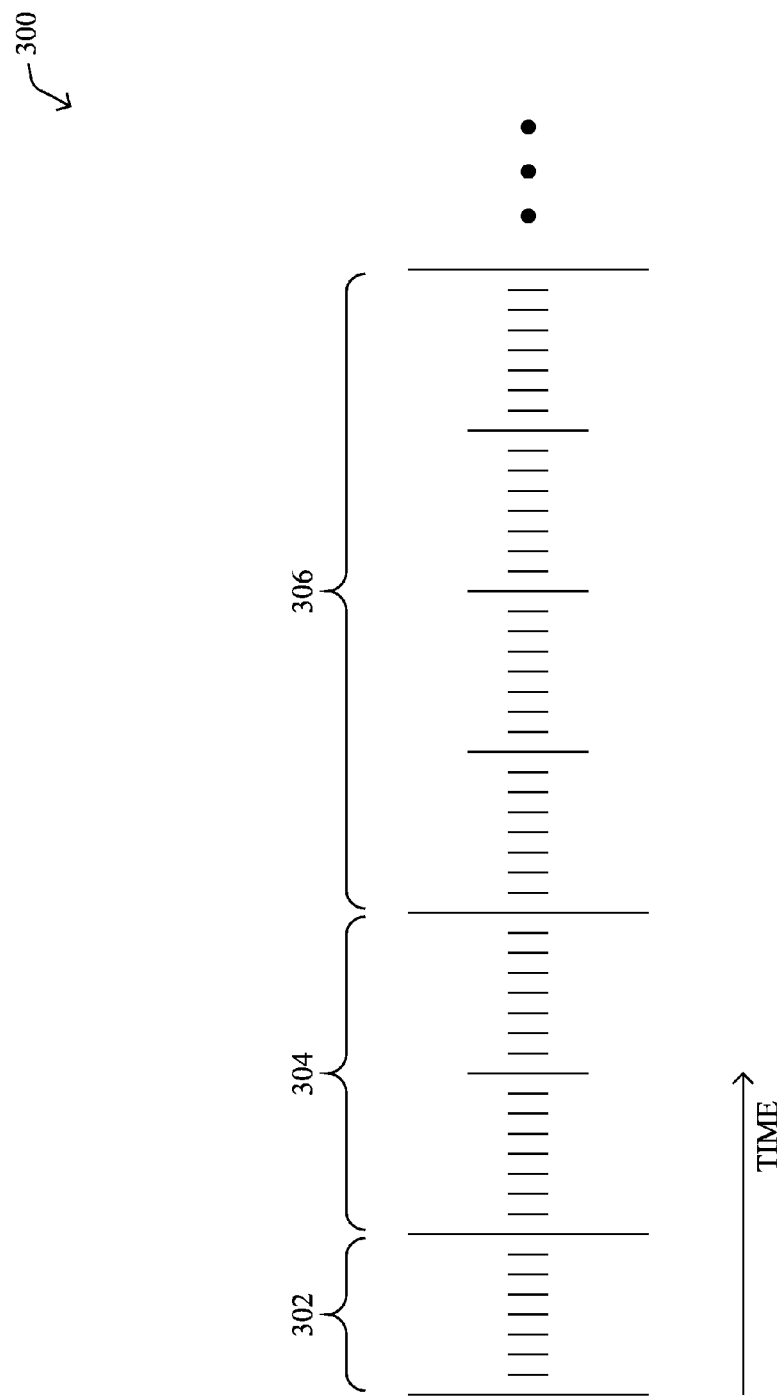
FIG. 3 illustrates an example typical Trickle period timeline.

FIG. 3 illustrates an example typical Trickle period timeline, such as that utilized in the disclosed embodiments. The Trickle timeline 300 comprises periods 302, 304, and 306. The periods progress in accordance with time. Therefore, the timeline depicts a typical Trickle progression, whereby once each period expires, the duration of the period doubles, and a new period begins, i.e., the timer is reset to zero.

The parameters, variables, and process steps of Trickle are discussed in further detail in RFC 6206. Notably, it should be understood that the disclosed embodiments may be compatible with, and applicable to, any similar redundancy-based transmission frequency reduction algorithm.

In one embodiment of the present disclosure, a transmission data rate of transmitted messages in a network may be adjusted according to a plurality of time-based events in the network, whereby the plurality of time-based events may be determined based on, for example, the Trickle algorithm. That is, the link-layer transmission data rate may be adjusted based on the Trickle interval size I. Therefore, the transmission data rate being utilized for network transmissions, such as multicast transmissions, may adapt to the current stage/period of the time-based events according to Trickle.

In particular, a higher transmission data rate may be utilized during an earlier stage of the plurality of time-based events, whereas a lower transmission data rate may be utilized during a later stage of the plurality of time-based events. That is, when the Trickle interval I is small, Trickle transmissions may be made using a higher data rate. On the other hand, when the Trickle interval I is large, Trickle transmissions may be made using a lower data rate.

The time (e.g., interval I) at which the transmission data rate transitions from higher to lower may vary. In this regard, the high data rate may be applied to any $I<I_{max}$ and low data rate only applied when $I=I_{max}$. As an alternative, the high data rate may be applied only when $I=I_{mm}$ and low data rate applied to any $I>I_{mm}$. As another alternative, the highest data rate may be applied to $I=I_{min}$, a slightly lower data rate (e.g., medium data rate) may be applied to $I_{min}<I<I_{max}$, and the lowest data rate applied when $I=I_{max}$. As another alternative, a threshold stage of the plurality of time-based events (e.g., a threshold Trickle interval) may be determined. In this scenario, the higher transmission data rate may be utilized before the threshold stage occurs, and the lower transmission data rate may be utilized after the threshold stage occurs. Intuitively, these rules cause devices to use high data rate transmissions during the initial phases of propagation, then switch to lower data rate transmissions to fill in any devices that missed the initial waves of propagation.

To illustrate, FIGS. 4A-5B depict example network configurations with varying Trickle intervals and resultant transmission data rates. In each of FIGS. 4A-5B, node 11 (configured in a manner equivalent to nodes 200) transmits messages 140 (e.g., multicast transmissions) at a particular transmission data rate to neighboring nodes 22, 33 and 44 via communication links 105. A Trickle interval spectrum (ranging from $I_{min}$ to $I_{max}$) is depicted in each Figure as 405, 415, 505 and 515, along with a triangle-shaped marker indicating the current interval I for each network configuration.

Figure 4A:
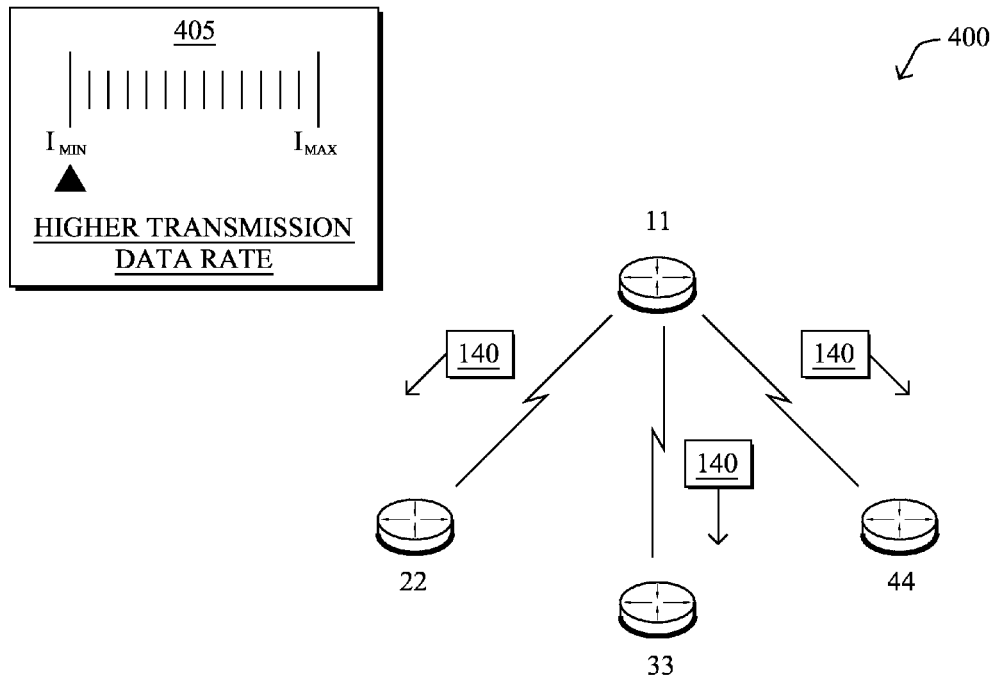
FIGS. 4A-5B illustrate example network configurations with varying Trickle intervals and resultant transmission data rates.
Figure 4B:
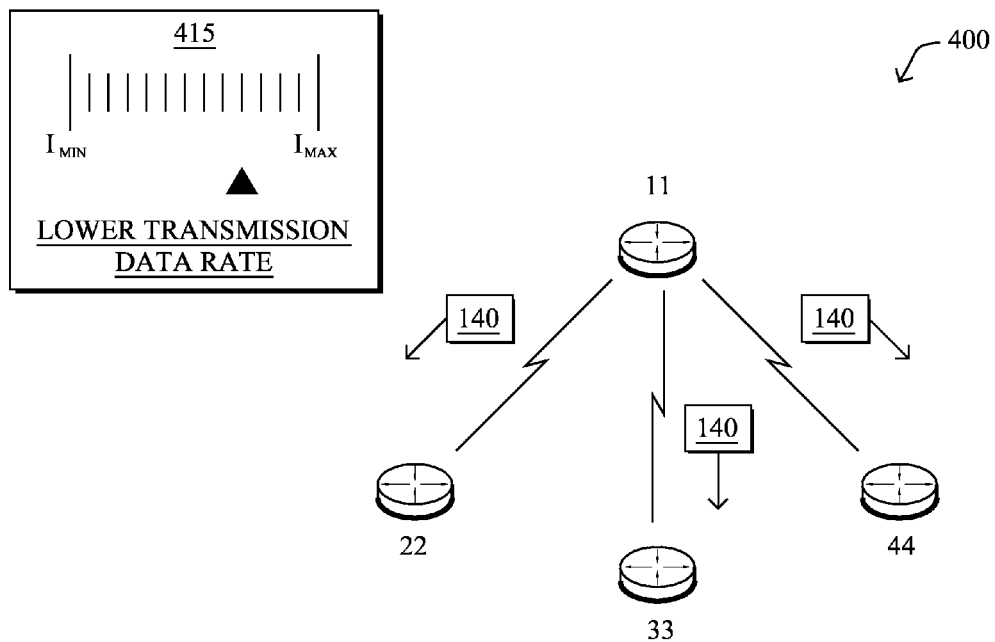
Figure 5A:
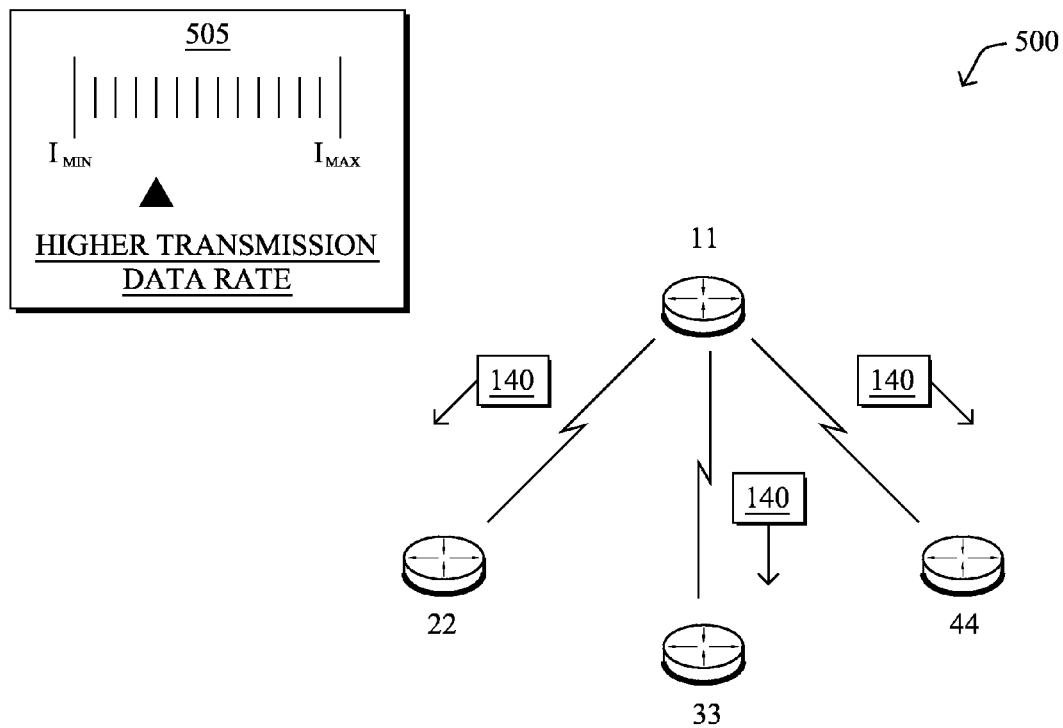
Figure 5B:
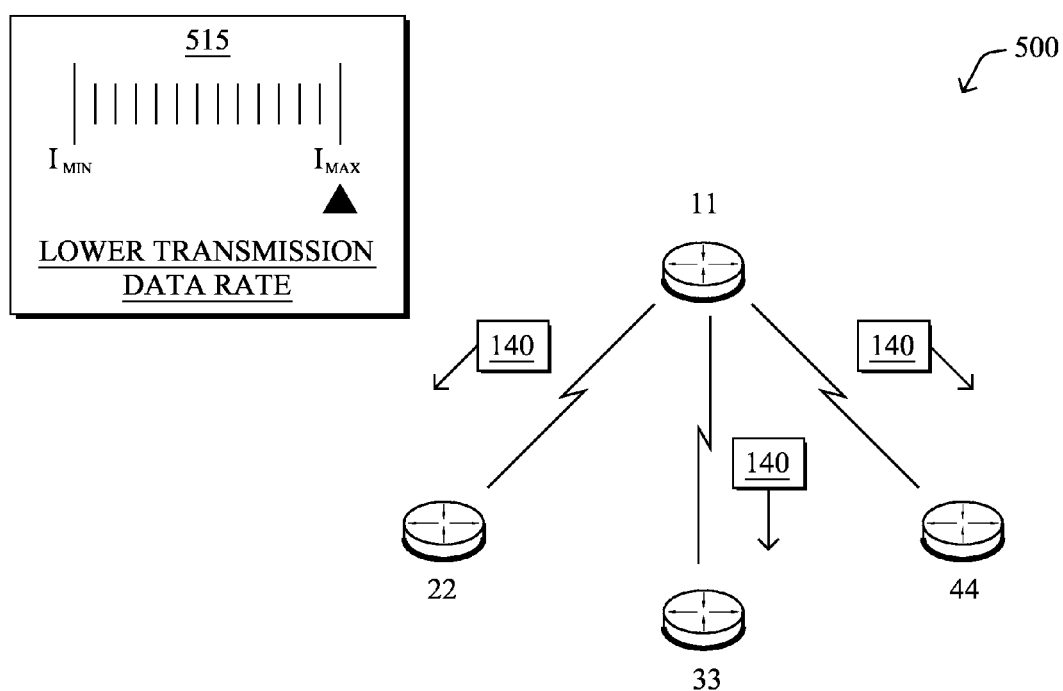

For example, FIG. 4A shows a network 400 in which the higher transmission data rate is used only when the current interval $I=I_{min}$, while FIG. 4B shows the network 400 in which the lower transmission data rate is used whenever the current interval $I>I_{min}$. On the other hand, FIG. 5A shows a network 500 in which the higher transmission data rate is used whenever the current interval $I<I_{max}$, while FIG. 5B shows the network 500 in which the lower transmission data rate is used only when the current interval $I=I_{max}$.

In another embodiment, an amount of the messages that were transmitted in accordance with the plurality of time-based events (e.g., Trickle transmissions) may be determined, and the transmission data rate may be adjusted according to the amount. Also, a threshold amount of the messages transmitted in accordance with the plurality of time-based events may be determined, whereby the higher transmission data rate may be utilized before the threshold amount occurs, and the lower transmission data rate may be utilized after the threshold amount occurs. That is, a separate count of Trickle transmissions may be maintained, and a lower link-layer transmission rate may be used when the number of transmissions exceeds a threshold.

Figure 6A:
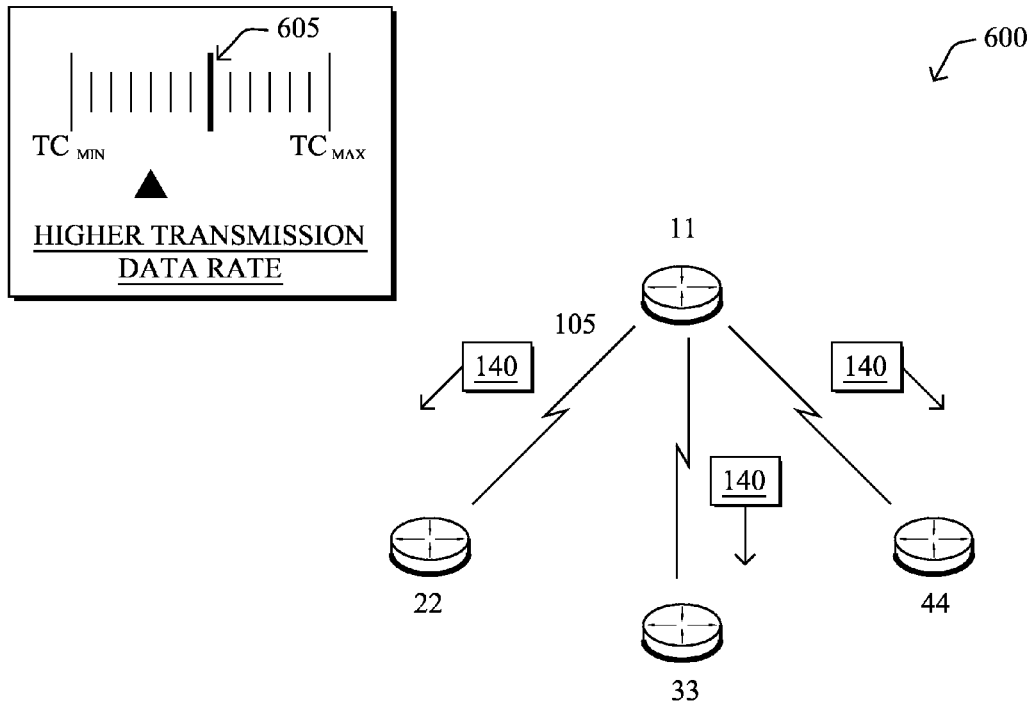
FIGS. 6A and 6B illustrate example network configurations with a Trickle transmission count and threshold transmission amount, as well as resultant transmission data rates.
Figure 6B:
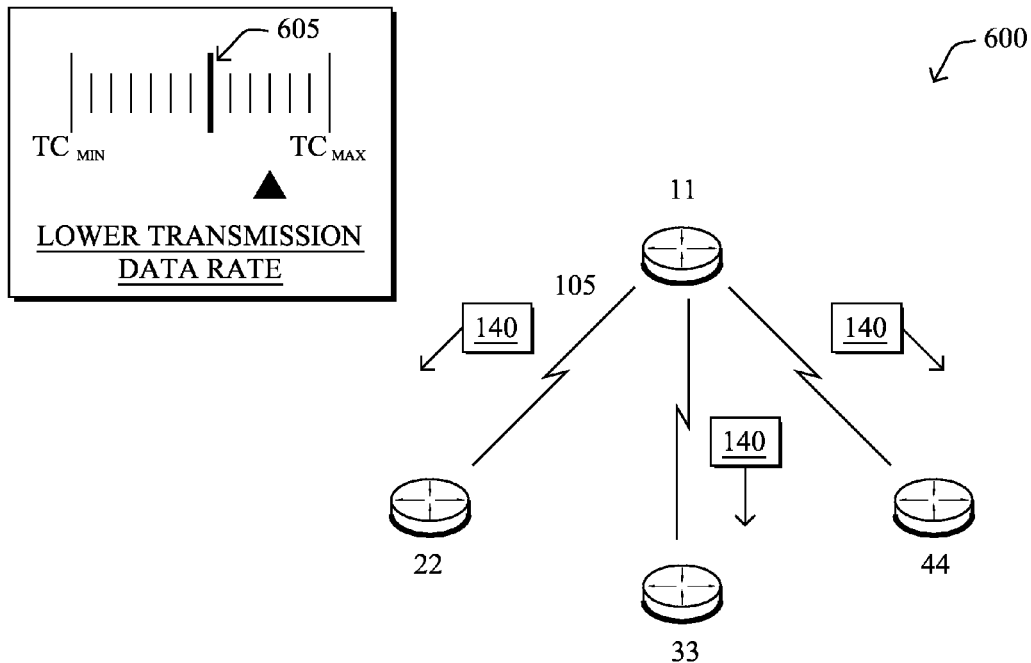

For example, FIGS. 6A and 6B illustrate example network configurations with a Trickle transmission count and threshold transmission amount, as well as resultant transmission data rates. In FIGS. 6A and 6B, a Trickle transmission count spectrum (ranging from $TC_{min}$ to $TC_{max}$) is shown with a threshold transmission amount 605, along with a triangle-shaped marker indicating the current transmission count for each network configuration. In particular, FIG. 6A shows network 600 in which the higher transmission data rate may be used when the current transmission count has not yet reached the threshold 605 (e.g., the threshold amount has not yet occurred). In contrast, FIG. 6B shows network 600 in which the lower transmission data rate may be used when the current transmission count has exceeded the threshold 605 (e.g., the threshold amount has occurred).

Using this approach, the number of Trickle transmissions may be reset to zero when receiving a new message (i.e., when disseminating a new message). In one embodiment, there may be only a slow and fast data transmission rate, and one related threshold. In another embodiment, there may be multiple data rates and multiple associated thresholds. Using transmission thresholds addresses asymmetric links which may make it possible to receive "inconsistent" Trickle messages from neighboring devices, but not possible to transmit Trickle messages at high data rates in the reverse direction.

Notably, using a higher data rate during the initial stages of propagation improves overall performance in at least couple ways. First, higher data rates allow for quicker propagation by transferring data quicker, occupying the channel for less time, and allowing for more transmissions from more devices allowing for greater spatial diversity. Second, Trickle relies on suppression techniques to adapt well in dense environments. For Trickle's suppression mechanisms to work well, devices must be able to receive the redundant transmissions. In particular, in cases where collisions prevent proper reception of messages, Trickle may actually perform worse since devices are not properly receiving redundant messages, leading to more transmissions, and resulting in a form of congestion collapse. Operating at a higher data rate reduces channel occupancy as well as the likelihood of collisions.

In another embodiment, the overall performance of Trickle may be improved with adaptive data rate transmissions for subsequent transmissions. In particular, a particular device in the computer network that receives one or more of the transmitted messages may be determined, and the transmission data rate (of a message transmitted to the particular device) may be adjusted based on the particular device. Moreover, information indicating a transmission data rate of the transmitted messages that corresponds to one or more devices in the computer network may be stored.

Figure 7:
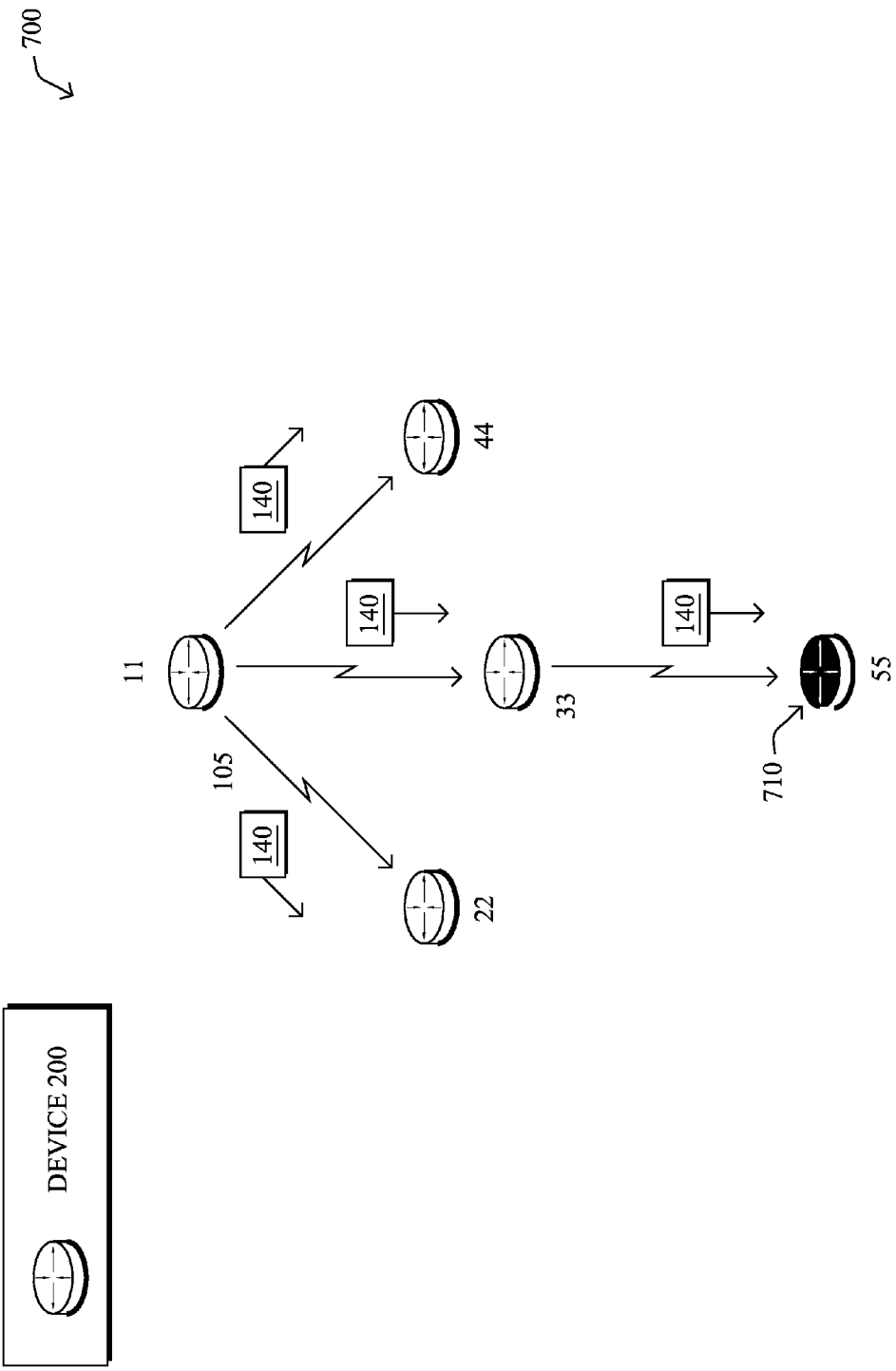
FIG. 7 illustrates an example network configuration including a sparsely connected neighboring node.

For example, FIG. 7 illustrates an example network configuration including a sparsely connected neighboring node. As shown in FIG. 7, a network 700 in which node 11 transmits messages 140 (e.g., multicast transmissions) at a particular transmission data rate to neighboring nodes 22, 33 and 44 via communication links 105. Illustratively, node 33 may forward the message 140 to neighboring node 55. For demonstration purposes, node 55 may be a sparsely connected neighbor, whereby a lower transmission data rate was used in order for the message 140 to reach the node (this phenomenon is described further below). As a result, when trying to transmit subsequent messages 140 to the sparsely connected neighboring node 55, a lower transmission data rate may be used, even during early stages of propagation. Moreover, information indicating that node 55 was previously reached using a lower transmission data rate may be stored, e.g., locally at node 33, at a root node of the network 700 (e.g., node 11, field area router (FAR), etc.), at a centralized management node (e.g., NMS 130), or the like. Thus, the stored information may be accessed for subsequent transmissions, such that nodes in the network 700 are aware that sparsely connected node 55 may be quickly reached via a lower transmission data rate.

In this regard, one property of Trickle is its long-tail distribution, where Trickle delivers the message to a large fraction of devices quickly but takes a while to deliver the message to the few remaining devices. The adaptive data rate approach can increase the long-tail that is typical to Trickle. In particular, because the slower data rates are not used until the later stages of the propagation, devices that are sparsely connected and require the lower data rate to receive the message will potentially wait longer to receive the message.

Using this approach, devices may remember when they receive an "inconsistent" transmission during the later stages sent using a lower data rate. In effect, this allows devices to discover if they have any sparsely connected neighbors. On subsequent Trickle disseminations, a device may use slower data rates during the initial propagation stages in order to reach the sparsely connected neighbors more quickly. Using this optimization, only those devices that are neighboring the sparsely connected devices will use lower data rate transmissions in the initial stages. Notably, a node may need only remember such information if it has at least one neighbor that requires a slow data rate transmission to be reached.

In another embodiment, a mapping between the transmission data rate and the plurality of time-based events (e.g., as determined by Trickle) may be adjusted. That is, a control loop may be implemented to tune the mapping between Trickle timer interval and link-layer transmission data rate. Also, the mapping may be performed by a centralized management device (e.g., NMS 130). In one embodiment, a Constrained Application Protocol (CoAP) message may be used to report communication delays for disseminated messages to a central location (e.g., NMS or FAR). The NMS/FAR could then adjust the mapping by, for example, sending a CoAP message back to individual nodes or including an option in a RPL DIO message.

Figure 8:
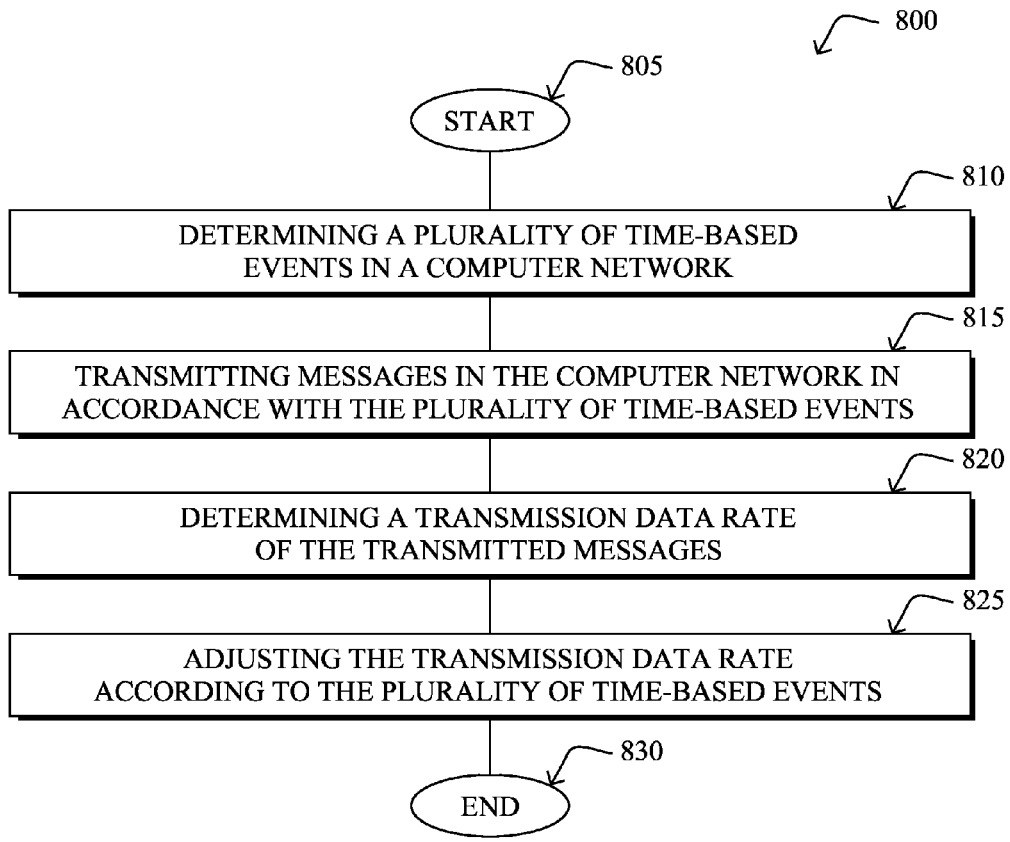
FIG. 8 illustrates an example simplified procedure for data rate adaptation based on time-based events.

FIG. 8 illustrates an example simplified procedure for data rate adaptation based on time-based events. The procedure 800 may start at step 805, and continues to step 810, where, as described in greater detail above, the transmission data rate of messages transmitted in a computer network are adjusted according to the plurality of time-based events.

At step 810, a plurality of time-based events is determined in a computer network. The plurality of time-based events may be determined by a redundancy-based transmission frequency algorithm, such as Trickle. At step 815, messages are transmitted in the computer network in accordance with the plurality of time-based events. The transmitted messages may be sent as a multicast transmission. At step 820, a transmission data rate of the transmitted messages is determined. Then, at step 825, the transmission data rate is adjusted according to the plurality of time-based events. The procedure 800 illustratively ends at step 830.

The techniques by which the steps of procedure 800 may be performed, as well as ancillary procedures and parameters, are described in detail above. It should be noted that certain steps within procedure 800 may be optional, and the steps shown in FIG. 8 are merely examples for illustration. Certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for data rate adaptation based on time-based events. In particular, the disclosed embodiments significantly improve the performance of data dissemination by applying link-layer data rate adaptation to the Trickle dissemination process. Defaulting to higher data rate transmissions during the initial stages of dissemination allows the propagation to occur more quickly, reduces channel occupancy during dissemination, and allows for more transmissions from more neighbors allowing greater frequency diversity. The higher data rate transmissions also improve the performance of Trickle's suppression mechanisms by reducing the likelihood of dropped packets. Also, by introducing a small bit of memory, devices can remember whether to service neighbors using slow data rate transmissions, thereby further improving overall performance on subsequent disseminations.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to LLNs and associated protocols (e.g., RPL). However, the embodiments in their broader sense are not as limited, and may, in fact, be used with other types of networks and/or protocols. In addition, although the embodiments herein are described primarily with respect to Trickle, it should be understood that the disclosed embodiments may be compatible with, and applicable to, any similar redundancy-based transmission frequency reduction algorithm. Also, while the techniques generally describe message transmission and time-based event management by a head-end node (e.g., node 11), a network management system/server (e.g., NMS 130) may also be used to provide intelligence to the network functions described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a network device, a plurality of time-based events in a computer network, wherein the time-based events are determined by a Trickle-based algorithm;
    transmitting, by the network device, messages in the computer network in accordance with the plurality of time-based events;
    determining, by network device, a transmission data rate of the transmitted messages; and
    adjusting, by the network device, the transmission data rate according to the plurality of time-based events, wherein faster transmission data rates are used with smaller Trickle periods and slower data rates with larger Trickle periods.

2. The method as in claim 1, further comprising:
    utilizing a higher transmission data rate during an earlier stage of the plurality of time-based events, and
    utilizing a lower transmission data rate during a later stage of the plurality of time-based events.

3. The method as in claim 2, further comprising:
    utilizing a medium transmission data rate during a middle stage of the plurality of time-based events.

4. The method as in claim 1, further comprising:
    determining a threshold stage of the plurality of time-based events;
    utilizing a higher transmission data rate before the threshold stage occurs; and
    utilizing a lower transmission data rate after the threshold stage occurs.

5. The method as in claim 1, further comprising:
    determining an amount of the messages that were transmitted in accordance with the plurality of time-based events; and
    adjusting the transmission data rate according to the amount.

6. The method as in claim 1, further comprising:
    determining a threshold amount of the messages transmitted in accordance with the plurality of time-based events;
    utilizing a higher transmission data rate before the threshold amount occurs; and
    utilizing a lower transmission data rate after the threshold amount occurs.

7. The method as in claim 1, further comprising:
    determining multiple threshold amounts of the messages transmitted in accordance with the plurality of time-based events, wherein multiple transmission data rates correspond to the multiple threshold amounts, respectively.

8. The method as in claim 1, further comprising:
    determining a particular device in the computer network that receives one or more of the transmitted messages; and
    adjusting the transmission data rate based on the particular device.

9. The method as in claim 1, further comprising:
    storing information indicating a transmission data rate of the transmitted messages that corresponds to one or more devices in the computer network.

10. The method as in claim 1, further comprising:
    adjusting a mapping between the transmission data rate and the plurality of time-based events.

11. The method as in claim 10, wherein the adjusting of the mapping is performed by a centralized management device.

12. An apparatus, comprising:
    one or more network interfaces to communicate with a computer network;
    a processor coupled to the one or more network interfaces and configured to execute one or more processes; and
    a memory configured to store program instructions which contain the process executable by the processor, the process comprising:
        determining a plurality of time-based events in the computer network, wherein the time-based events are determined by a Trickle-based algorithm;
        transmitting messages in the computer network in accordance with the plurality of time-based events;
        determining a transmission data rate of the transmitted messages; and
        adjusting the transmission data rate according to the plurality of time-based events, wherein faster transmission data rates are used with smaller Trickle periods and slower data rates with larger Trickle periods.

13. The apparatus as in claim 12, wherein the process further comprises:
    utilizing a higher transmission data rate during an earlier stage of the plurality of time-based events, and
    utilizing a lower transmission data rate during a later stage of the plurality of time-based events.

14. The apparatus as in claim 13, wherein the process further comprises:
    utilizing a medium transmission data rate during a middle stage of the plurality of time-based events.

15. The apparatus as in claim 12, wherein the process further comprises:
    determining a threshold stage of the plurality of time-based events;
    utilizing a higher transmission data rate before the threshold stage occurs; and
    utilizing a lower transmission data rate after the threshold stage occurs.

16. The apparatus as in claim 12, wherein the process further comprises:
    determining an amount of the messages that were transmitted in accordance with the plurality of time-based events; and
    adjusting the transmission data rate according to the amount.

17. The apparatus as in claim 12, wherein the process further comprises:
    determining a threshold amount of the messages transmitted in accordance with the plurality of time-based events;

utilizing a higher transmission data rate before the threshold amount occurs; and utilizing a lower transmission data rate after the threshold amount occurs.

18. The apparatus as in claim 12, wherein the process further comprises:

determining multiple threshold amounts of the messages transmitted in accordance with the plurality of time-based events, wherein multiple transmission data rates correspond to the multiple threshold amounts, respectively.

19. The apparatus as in claim 12, wherein the process further comprises:

determining a particular device in the computer network that receives one or more of the transmitted messages; and adjusting the transmission data rate based on the particular device.

20. The apparatus as in claim 12, wherein the process further comprises:

storing information indicating a transmission data rate of the transmitted messages that corresponds to one or more devices in the computer network.

21. The apparatus as in claim 12, wherein the process further comprises:

adjusting a mapping between the transmission data rate and the plurality of time-based events.

22. The apparatus as in claim 21, wherein the adjusting of the mapping is performed by a centralized management device.

23. A tangible non-transitory computer readable medium storing program instructions that cause a computer to execute a process, the process comprising:

determining a plurality of time-based events in a computer network, wherein the time-based events are determined by a Trickle-based algorithm;

transmitting messages in the computer network in accordance with the plurality of time-based events;

determining a transmission data rate of the transmitted messages; and adjusting the transmission data rate according to the plurality of time-based events, wherein faster transmission data rates are used with smaller Trickle periods and slower data rates with larger Trickle periods.

* * * * *